United States Patent
Prasanna Kumar et al.

(10) Patent No.: US 10,534,772 B2
(45) Date of Patent: Jan. 14, 2020

(54) CONTROL OF A DISTRIBUTED DATA GRID LAYER IN A FEDERATED DATABASE SYSTEM

(71) Applicant: TELEFONAKTIEBOLAGET L M ERICSSON (PUBL), Stockholm (SE)

(72) Inventors: Manoj Prasanna Kumar, Chennai (IN); Subramanian Shivashankar, Chennai (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 370 days.

(21) Appl. No.: 14/902,987

(22) PCT Filed: Jul. 8, 2013

(86) PCT No.: PCT/SE2013/050879
§ 371 (c)(1),
(2) Date: Jan. 5, 2016

(87) PCT Pub. No.: WO2015/005833
PCT Pub. Date: Jan. 15, 2015

(65) Prior Publication Data
US 2016/0154847 A1    Jun. 2, 2016

(51) Int. Cl.
*G06F 17/00* (2019.01)
*G06F 16/2453* (2019.01)
*G06F 16/2458* (2019.01)

(52) U.S. Cl.
CPC .... *G06F 16/24542* (2019.01); *G06F 16/2471* (2019.01)

(58) Field of Classification Search
CPC ........... G06F 17/30306; G06F 17/3053; G06F 17/30887; G06F 17/30545; G06F 17/30445; G06F 17/30463
See application file for complete search history.

(56) References Cited

U.S. PATENT DOCUMENTS 5,317,568 A * 5/1994 Bixby .................... H04L 29/06
370/401
6,779,039 B1 * 8/2004 Bommareddy ... H04L 29/12009
709/226

(Continued)

OTHER PUBLICATIONS

International Search Report and Written Opinion dated Jan. 23, 2014, in International Application No. PCT/SE2013/050879, 7 pages.

(Continued)

*Primary Examiner* — Jean M Corrielus
(74) *Attorney, Agent, or Firm* — Rothwell, Figg, Ernst & Manbeck, P.C.

(57) ABSTRACT

The invention is directed towards a database access coordination arrangement (23) in a federated database system (10) comprising applications (Ai, A2, A3) that access databases (34-50) under the control of a number of query handlers (24-32), the database access coordinating arrangement providing a group of traffic distribution units (16-22), each having connections to corresponding query handlers, and a traffic control unit (TCU), which traffic control unit selects traffic distribution unit for a query (Qi) from an application (Ai) based on at least one connectivity map of the connections existing between traffic distribution units, query handlers and databases and connectivity states of connections between traffic distribution units and query handlers, and schedules the query to the selected traffic distribution unit for accessing a database.

17 Claims, 6 Drawing Sheets

(56) References Cited

U.S. PATENT DOCUMENTS

| | | | |
|---|---|---|---|
| 7,600,033 B2* | 10/2009 | Bauer | H04L 67/104 370/230.1 |
| 2002/0120697 A1* | 8/2002 | Generous | H04L 29/06 709/206 |
| 2003/0217079 A1* | 11/2003 | Bakalash | G06F 16/2455 |
| 2008/0027947 A1* | 1/2008 | Pritchett | G06F 17/30887 |
| 2009/0271379 A1* | 10/2009 | Bakalash | G06F 16/2455 |
| 2009/0276410 A1* | 11/2009 | Bakalash | G06F 16/2455 |
| 2010/0042645 A1* | 2/2010 | Bakalash | G06F 16/2455 707/607 |
| 2010/0063958 A1* | 3/2010 | Bakalash | G06F 16/2455 707/600 |
| 2010/0094862 A1 | 4/2010 | Bent et al. | |
| 2010/0100558 A1* | 4/2010 | Bakalash | G06F 16/2455 707/756 |
| 2011/0106789 A1* | 5/2011 | Gao | G06F 17/30545 707/713 |
| 2012/0166483 A1 | 6/2012 | Choudhary et al. | |
| 2012/0310992 A1* | 12/2012 | Antani | G06F 17/30445 707/802 |
| 2015/0234831 A1* | 8/2015 | Prasanna Kumar | G06F 16/256 707/718 |
| 2016/0019245 A1* | 1/2016 | Padmanaabhan | G06F 17/30306 707/609 |

OTHER PUBLICATIONS

Instance Based Learning "Nearest Neighbor" 2013, 13 pages.

* cited by examiner

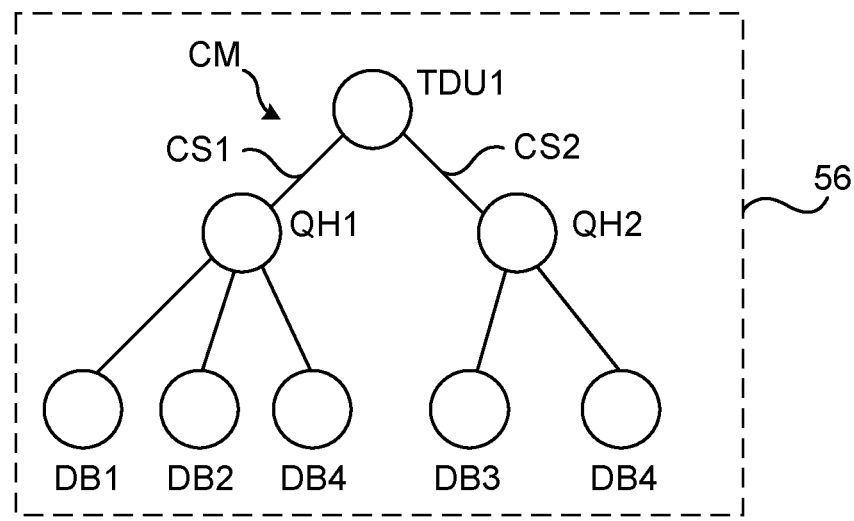
Fig. 5
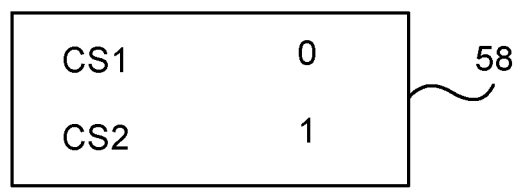
Fig. 6
| QH1 | Lm1 | Lcpu1 |
| QH2 | Lm2 | Lcpu2 |
| QH3 | Lm3 | Lcpu3 |
| QH4 | Lm4 | Lcpu4 |
| QH5 | Lm5 | Lcpu5 |
Fig. 7

CONTROL OF A DISTRIBUTED DATA GRID LAYER IN A FEDERATED DATABASE SYSTEM

CROSS REFERENCE TO RELATED APPLICATION(S)

This application is a 35 U.S.C. § 371 National Phase Entry Application from PCT/SE2013/050879, filed Jul. 8, 2013, designating the United States, the disclosure of which is incorporated herein in its entirety by reference.

TECHNICAL FIELD

The invention relates to federated database systems. More particularly, the invention relates to a database access coordination arrangement in a federated database system as well as to a method, computer program and computer program product for coordinating database access in a federated database system

BACKGROUND

Systems like mobile telephone systems may comprise a variety of databases of different types, which databases comprise data and may be queried by different query generating applications, such as by core applications in a core network or by third party applications. The database systems may then be divided into different levels or tiers, where there may be a data level, an application level and above this an enterprise level.

This type of division is necessary when there are many applications and many databases. A system having this type of structure is often denoted a federated database system.

Almost all kinds of application generate data. Most applications, log usage data of their clients for analytics. This makes the so called "Big Data" problem complex. Data to be stored and retrieved on a transactional basis is huge. In real time applications, like Home Location Register (HLR)/session description protocol (SDP) applications, the data handled is huge and should be retrieved from the database almost seamlessly. For such scenarios, a federated database setup consisting of a common data grid layer (for e.g., data nucleus) that distributes data over a wide variety of databases like HBase, Postgres, GraphDB etc., would be ideal. Highly relational data would be stored in structured query langue (SQL) based databases like Postgres. Graph based data would be stored in databases like Giraph.

The data grid takes care of the data transfer from/to applications and the databases. It distributes data in such a way that the latency to retrieve data is maintained. In such a case, the data grid is the most vital component that is responsible for the entire data. Failure of the data grid, especially in Telecom world cannot be tolerated as users will not be able to make calls. However, a central data grid instance can only handle limited traffic at any given instant. Distributing the data grid across multiple servers and handling the distribution of traffic across all instances of the data grid using a co-ordination service would be the ideal solution for this scenario.

The data grid layer in the existing federated database environments is furthermore centralised. Hence, if there is a failure of the data grid, there will be a blocking of the access to various data sources handled by the data grid. Failure is therefore not handled effectively in the existing federated database setups.

There is thus a need for improvement in the field of federated database systems, where one field of improvement is the handling of failures in data grid in order to obtain fault tolerance.

SUMMARY

One object of the invention is thus to provide an improvement in a federated database system and more particularly an improvement involvement a high degree of fault tolerance.

This object is according to a first aspect of the invention achieved by a database access coordination arrangement in a federated database system. The database system comprises applications configured to access databases under the control of a number of query handlers, where each query handler is connected to a number of databases. The database access coordinating arrangement comprises a processor and memory, where the memory contains computer instructions executable by the processor through which the database access coordination arrangement is operative to provide
a group of traffic distribution units, each having connections to corresponding query handlers and a traffic control unit (TCU).

The traffic control unit selects traffic distribution unit for a query from an application based on at least one connectivity map of the connections existing between traffic distribution units, query handlers and databases and connectivity states of connections between traffic distribution units and query handlers, and
schedules the query to the selected traffic distribution unit for accessing a database.

This object is according to a second aspect also achieved by a method for coordinating database access in a federated database system. The database system comprises applications configured to access databases under the control of a number of query handlers. Each query handler is connected to a number of databases and to one or more traffic distribution units in a group of traffic distribution units. The method comprises selecting traffic distribution unit for a query from an application based on at least one connectivity map of the connections existing between traffic distribution units, query handlers and databases and connectivity states of connections between traffic distribution units and query handlers, and scheduling the query to the selected traffic distribution unit for accessing a database.

The object is according to a third aspect achieved through a computer program for coordinating database access in a federated database system. The database system comprises applications configured to access databases under the control of a number of query handlers. Each query handler is connected to a number of databases and to one or more traffic distribution units in a group of traffic distribution units. The computer program comprises computer program code which when run in a database access coordination arrangement causes the database access coordination arrangement to:
select traffic distribution unit for a query from an application based on at least one connectivity map of the connections existing between traffic distribution units, query handlers and databases and connectivity states of connections between traffic distribution units and query handlers, and
schedule the query to the selected traffic distribution unit for accessing a database.

The object is according to a fourth aspect furthermore achieved by a computer program product for coordinating database access in a federated database system, which computer program product is provided on a data carrier and comprises said computer program code according to the third aspect.

The invention according to the above-mentioned aspects have a number of advantages. Queries are effectively distributed to the set of query handlers. Furthermore through the use of connectivity maps and connectivity states, changes can be quickly made in the distribution of queries, which improves the fault tolerance.

In an advantageous variation of the first aspect, the traffic control unit is further configured to select a query handler for the query and to schedule the query also to the query handler.

In a corresponding variation of the second aspect, the method further comprises selecting a query handler for the query, wherein the scheduling comprises scheduling the query also to the query handler.

The connectivity state of a connection may depend on alive messages sent by a query handler to a corresponding traffic distribution unit. The connectivity state of a connection may be connected if alive messages are timely received and disconnected if they are not.

An alive message from a query handler may furthermore comprise at least one load value of the query handler, According to a further variation of the first aspect, if the query is a write query, the traffic control unit is further configured to determine at least one load factor for the query and schedule the query based on the load factor of the query and corresponding load values of the traffic distribution units.

According to a corresponding variation of the second aspect, if the query is a write query the method further comprises determining at least one load factor for the query and scheduling the query to a traffic distribution unit based on the load factor of the query and corresponding load values of the traffic distribution units.

A traffic distribution unit may be selected for the query which will balance the load between the traffic distribution units.

The load factor of the query may furthermore be determined as a weighted average of loads of similar queries.

One of the traffic distribution units may act as the traffic control unit. Each traffic distribution unit also has an identity, where the identities are sequentially generated and assigned at instantiating. It is furthermore possible that the traffic control unit may fail.

According to yet another variation of the first aspect, a traffic distribution unit is in this case configured to, in a traffic selection scheme, send the own identity to the other traffic distribution units, receive the identities of these other traffic distribution units, compare the own identity with the received identities and seize the role of traffic control unit if the own identity precedes the others in the sequence.

According to a corresponding variation of the second aspect, the method then comprises sending, in a traffic selection scheme, the own identity to the other traffic distribution units, receiving the identity of these other traffic distribution units, comparing the own identity with the received identities, and seizing the role of traffic control unit if the own identity precedes the others in the sequence.

When a traffic control unit seizes the role as traffic control unit it may furthermore broadcast any connectivity maps that it itself is in possession of to the other traffic distribution units.

The traffic control unit may furthermore be configured to periodically send alive messages to the other traffic distribution units.

According to a further variation of the first aspect, a traffic distribution unit may then be configured to enter the traffic selection scheme if no alive message is received from the traffic control unit within an alive message time limit.

According to a corresponding variation of the second aspect, the method further comprises entering the traffic selection scheme if no alive message is received from the traffic control unit within an alive message time limit.

A connectivity map may also be provided for each traffic distribution unit. It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which:

FIG. 6 shows connectivity states for query handlers connected to a traffic distribution unit, FIG. 7 shows a number of load values for a number of query handlers.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

In federated database systems, i.e. in systems where there are many applications needing to access many databases, there may be provided a data grid layer handling access requests from the applications and forwarding the requests to appropriate databases.

Known data grid layers in federated database environments are not distributed. Hence, if there is a failure in the data grid, access to various data sources handled by the data grid may be blocked This means that possible failures in a data grid layer are not handled effectively. Furthermore, in these known systems there is no co-ordination service that takes care of traffic distribution.

In order to address this situation embodiments of the invention propose the use of a distributed data grid and coordination of the incoming data traffic to the distributed data grid, i.e. a coordination of the database queries that enter the data grid.

Embodiments of the invention are therefore directed towards a federated database system where there may exist one or more applications using corresponding databases. In such a system an application should be able to operate efficiently with regard to accessing the database. The various embodiments provide a database access coordination arrangement where, in addition to providing fault tolerance, load balancing, query resource prediction, and traffic scheduling is obtained. Here it should be understood that traffic scheduling is the scheduling of queries in the database system. How this may be provided will be described in more detail the following.

Figure 1:
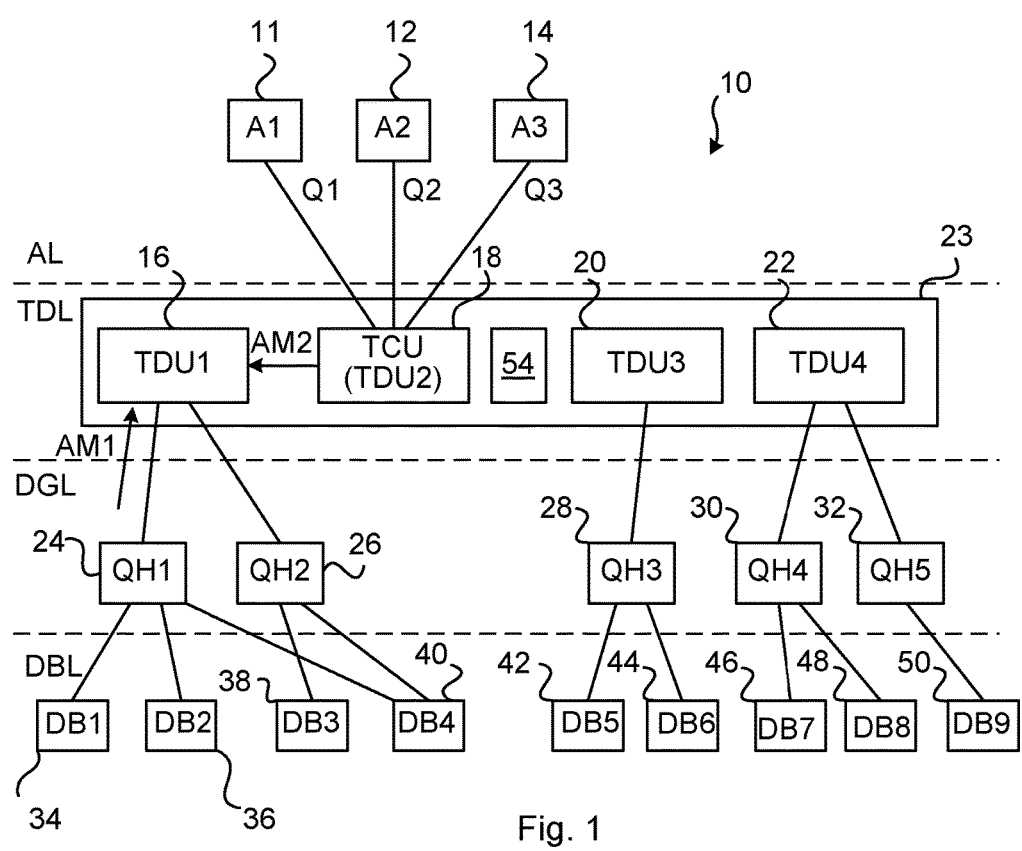
FIG. 1 schematically shows a federated database system, where there is an application layer with a number of devices comprising applications, a traffic distribution layer with traffic distribution units, a data grid layer with query handlers and a database layer with a number of databases.

In FIG. 1 there is shown a federated database system 10.

The federated database system 10 may be a part of a larger system, such as a mobile communication system, like Long Term Evolution (LTE) or Wideband Code Division Multiple Access (WCDMA). A mobile communication system may furthermore comprise a radio access network and a core network, where the core network may provide core network functionality such as keeping track of mobile terminals and their locations. This type of functionality may be based on one or more home location registers (HLR) that may need to use the databases of the federated database system 10. It is also known for various types of third party application servers connecting to such a mobile communication system. Also these servers may need to employ the federated database system 10.

In the federated database system 10 there is a first data handling device 11, a second data handling device 12 and a third data handling device 14. In each of these data handling devices 11, 12 and 14 there is furthermore running an application which accesses one or more corresponding databases, for instance through writing data to or reading data from the database. There is here a first application A1 in the first data handling device 11, a second application A2 in the second data handling device 12 and a third application A3 in the third data handling device 14. The data handling devices are furthermore provided in an application layer AL of the database system 10. The applications are configured to store data in and/or fetch data from corresponding databases. Therefore, there is database layer DBL with databases. In this layer DBL there is a first database DB1 34, a second database DB2 36 a third database DB3 38, a fourth database DB4 40, a fifth database DB5 42, a sixth database DB6 44, a seventh database DB7 46, an eighth database DB8 48 and a ninth database DB9 50. As an example the first database 34 may be an Hbase database, the second database 36 may be a Postgres database, the third database 38 may be a further Hbase database, the fourth database 40 may be a GraphDB database, the fifth database 42 may be a Giraph database, the sixth database 44 may be yet another Hbase database, the seventh database 46 may also be an HBase database, the eighth database 48 may be a Postgres database and the ninth database 50 may be an Hbase database. It should be realized that the number and types are merely exemplifying. It should also be realized that the database types mentioned above are merely examples of database types that may be used.

The databases may all comprise processors such as central processing units (CPU) and data-stores in the form of memories.

The accessing of a database is furthermore performed under the mediation of a query handler in a data grid layer DGL. There are a number of such query handlers in the data grid layer DGL. There is a first query handler QH1 24 being connected to the first, second and fourth databases 34, 36 and 40, a second query handler QH2 26 being connected to the third and fourth databases 38 and 40. There is also a third query handler QH3 28 connected to the fifth and sixth databases 42 and 44, a fourth query handler QH4 30 connected to the seventh and eighth databases 46 and 48 and finally a fifth query handler QH5 32 connected to the fifth and ninth databases 42 and 50. It should also here be realized that the number of query handlers and the databases they are connected to are only exemplifying. However, a query handler being connected to more than one database is typically connected to different types of databases. The first query handler QH1 would thus normally not be connected to the first and third databases, since these are both Hbase databases.

There is also a traffic distribution layer TDL. In the traffic distribution layer TDL there is a first traffic distribution unit TDU1 16, a second traffic distribution unit TDU2 18, a third traffic distribution unit TDU3 20 and a fourth traffic distribution unit TDU4 22. In the traffic distribution layer TDL there is also a system store 54 that may be accessed by all of the traffic distribution units. The traffic distribution units, perhaps together with the system store 54, together make up a database access coordination arrangement 23. The first traffic distribution unit 16 is connected to the first and second query handlers 24 and 26, where the first query handler 24 is shown as sending a first type of alive message AM1 to the first traffic distribution unit 16. The third traffic distribution unit 20 is connected to the third query handler 28 and the fourth traffic distribution unit 22 is connected to the fourth and fifth query handlers 30 and 32. The second traffic distribution unit 18 is also shown as sending a second type of alive message AM2 to the first traffic distribution unit 16. The second traffic distribution unit 18 is not connected to any query handler. Instead it is functioning as a traffic control unit TCU. For this reason it is also shown as receiving a first database query Q1 from the first application A1, a second database query Q2 from the second application and a third database query Q3 from the third application A3. Queries may be sent for the applications using Session Initiation Protocol (SIP) messages.

Figure 2:
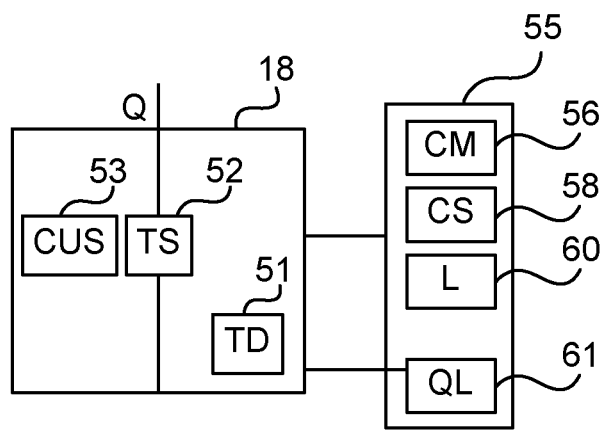
FIG. 2 shows a block schematic of a traffic distribution unit connected to a system memory.

In FIG. 2 there is schematically shown a traffic distribution unit being exemplified by the second traffic distribution unit. It comprises a traffic scheduler TS 52, a traffic distributor TD 51 and a control unit selector CUS 53. The second traffic distribution unit is acting as a traffic control unit. In one variation, all traffic distribution units have the same functionality and in this case they will all be provided with a traffic scheduler 52, traffic distributor 51 and control unit selector 53. In this case the traffic scheduler 52 may only be active in the traffic distribution unit acting as a traffic control unit. In another variation only the second traffic control unit may act as a traffic control unit and therefore it may be the only traffic distribution unit comprising a traffic scheduler 52, while the others only have traffic distributors. In this case there may be no control unit selectors. In this case it is also possible that the traffic control unit lacks a traffic distributor. As the second traffic distribution unit is acting as a traffic control unit, it is also connected to an own copy 55 of the system store. The copy as well as the original system store comprises connectivity maps CM 56 for different routes to the databases, a set of connectivity states CS 58 for the connections between traffic distribution units and query handlers as well as a load value section L 60 for the traffic distribution units. There is also a query load section QL 61 comprising load values for queries, where the queries may be organized according to type, which in this case is an organisation according to the data types they are concerned with as well as possibly the database tables they concern.

Figure 3:
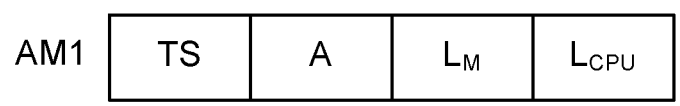
FIG. 3 shows a first type of alive message sent by a query handler.

FIG. 3 schematically shows the first type of alive message AM1, It comprises a time stamp TS, an alive indicator A and optionally also load values, here a memory load value Lm, and a processing load value Lcpu which is a load value representing processing load, for instance the load on a central processing unit (cpu).

Figure 4:
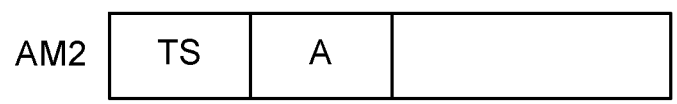
FIG. 4 shows a second type of alive message sent by a traffic control unit, FIG. 5 schematically shows a connectivity map provided for a traffic distribution unit.

FIG. 4 schematically shows a second type of alive message AM2, which comprises a time stamp TS and an alive indicator A.

FIG. 5 schematically shows a connectivity map, which connectivity map CM is provided in relation to the first traffic distribution unit 16. It should be realized that there is normally one such connectivity map for each traffic distribution unit having connections to query handlers. The map CM is a hierarchical map, for instance in the form of a tree, with the first traffic distribution unit TDU1 in the top and the databases to which it connects in the bottom. Therefore the connectivity map CM describes the connections that are shown in FIG. 1 for the first traffic distribution unit TDU1. The map therefore comprises a top node representing the first traffic distribution unit TDU1, which is connected to two intermediate nodes, representing the first and second query handler QH1 and QH2, the connection between the top node and the intermediate node representing the first query handler QH1 here has a first connectivity state CS1, while the connection between the top node and the intermediate node representing the second query handler QH2 has a second connectivity state CS2. It can be seen that the intermediate node representing the first query handler is connected to bottom level nodes representing the first, second and fourth databases, DB1, DB2 and DB4, while the intermediate node representing the second query handler QH2 is connected to separate bottom level nodes representing the third and the fourth databases DB3 and DB4. As can be seen that map in FIG. 5 is provided for one traffic distribution unit. As an alternative there may be one map that is common for all traffic distribution units. This could be done through adding the traffic control unit as a top node and connecting the maps of the traffic distribution units to this top node.

The connectivity map is provided in a shared hierarchal namespace which is organized similar to a standard file system. The name space comprises data registers and these are similar to files and directories. However, unlike a typical file system, which is designed for storage, traffic distributor data is kept in-memory and so it can achieve high throughput and low latency.

The connectivity states CS represent the fact that a connection exists or does not exist and a connectivity state has one logical value representing such a fact. As an example the connectivity states of the first and second connections form the first and second query handlers to the first traffic distribution unit are shown in FIG. 6. As can be seen the first connectivity state CS1 is set to zero and the second connectivity state CΩ is set to one. In this example a state of zero indicates that the connection is bad or non-existing, while a one indicates that there is good connection.

FIG. 7 schematically shows a number of load values that are provided for the different query handlers. The query handlers here more particularly each have two load values. The first query handler QH1 has a first memory load value Lm1 and a first cpu load value Lcpu1, which represents the memory use and cpu use of the first query hander QH1 in relation to the databases to which it is connected. The second query handler QH2 has a second memory load value Lm2 and a second cpu load value Lcpu2. In a similar manner the third query hander QH3 has a third memory load value Lm3 and a third cpu load value Lcpu2, the fourth query handler has a fourth memory load value Lm4 and a fourth cpu load value Lcpu4 and the fifth query handler QH5 has a fifth memory load value Lm4 and a fifth cpu load value Lcpu5.

Figure 8:
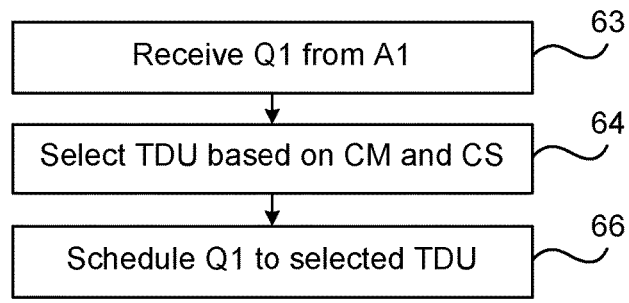
FIG. 8 shows a flow chart of a first embodiment of a method for coordinating database access in a federated database system.

Now a first embodiment will be described with reference being made to FIGS. 1, 2, 3, 5 and 6 as well as to FIG. 8, which shows a flow chart of a method for coordinating database access in a federated database system In a federated database system there may exist a lot of applications and a lot of databases. One way to simplify for an application to connect to a database is through the introduction of query handlers. A query handler may then receive a query, find out which database it is intended for, forward the query to the database, receive a database response and then return the response to the application. This relieves the applications from the burden of having to keep track of the various databases that they are to communicate with and the format to be used when accessing the databases.

A query handler may for instance investigate queries, prioritise between queries for instance dynamically and based on the estimated execution time.

However, as the number of applications and databases increase, it is not enough with one query handler. A single query handler may not be able to handle the load. There may therefore be a need for several query handlers that route queries to appropriate databases in parallel with each other. In this way the traffic load is distributed through the amount of queries handled by one query handler being reduced. Thereby the query response time may be kept low. However, there is a problem when providing such a distribution that the load may be unevenly spread. There is also a problem with the fault tolerance. If there is a fault the load balancing may become even more uneven. This means that the advantages of having a distributed handling of queries may be limited.

One purpose of the first embodiment is to provide fault handling ability through considering connectivity maps provided for the traffic distribution units as well as connectivity states when selecting routes for queries.

There is thus a distribution of the functions in the data grid layer DGL through the provision of a number of parallel query handlers and a coordination of the incoming traffic of queries together with a coordination service using a number of traffic distribution units.

In the system there is a traffic control unit, which may be a traffic distribution unit that takes on a role of traffic leader. However, it should be realized that a traffic control unit may be a separate entity that is only responsible for traffic control, i.e. for determining which queries are to be forwarded to which traffic distribution unit for being taking care of by a query handler connected this traffic distribution unit.

The functionality of the data grid layer is thus distributed across multiple instances through the provision of several parallel query handlers. This is combined with a group or cluster of traffic distribution units. The cluster of traffic distribution units thus include a set of traffic distributor instances, each of which takes care of distributing query traffic to a set of query handlers in the data grid layer. All the traffic distributor instances report to the traffic control unit or traffic leader for synchronization.

The traffic distribution layer provides a distributed co-ordination service that takes care of distributing the traffic to data grids. It exposes a simple set of primitives to implement higher level services for synchronization, configuration maintenance, groups and naming.

The connection of the structure may have been decided based on load sharing principles, for instance by the traffic control unit and once connections have been set up, these are stored in a connectivity map. Each traffic distribution unit may furthermore be equipped with an own copy of the contents of the system store.

In the structure shown in FIG. 1, the query handlers periodically send alive messages to the traffic distribution units they are connected. As an example they may send the first type of alive messages AM1. However, the alive messages used in this first embodiment do not need to include load data, which is the case if for instance only read queries are being handed. The alive message may thus be periodic heartbeat messages. In the structure of FIG. 1 the first query handler 24 thus sends alive messages to the first traffic distribution unit 16, the second query handler 26 also sends alive messages to the first traffic distribution unit 16. The third query handler 28 sends alive messages to the third traffic distribution unit 20 and the fourth and fifth query handlers 30 and 32 send alive messages to the fourth traffic distribution unit 22. In this first embodiment, the alive messages do not have to be of the first type but may be of the second type. They do thus not necessarily have to comprise load values Lm and Lcpu. However, they do comprise time stamps TS and an alive indicator A.

Based on the alive messages they receive, i.e. based on the alive indication A and time stamp TS indicating the time of generation, the traffic distributor 51 of a traffic distribution unit determines if there is connection to the corresponding query handler or not. The traffic distributor 51 of each traffic distribution unit then updates the connectivity states for its query handler connections. The traffic distributor 51 of a traffic distribution unit thus stores a connectivity state value for each query handler connection based on the timely reception of alive messages from these query handlers. As an example the first traffic distribution unit 16 may here not have received an alive message in time from the first query handler 24, why the connectivity state of this connection is set to zero, while the second query handler does provide timely alive messages, and therefore the corresponding connectivity state may be set to "one". The connectivity state of a connection thus depends on alive messages sent by a query handler to a corresponding traffic distribution unit, where the connectivity state of a connection may be connected if alive messages are timely received and disconnected if they are not.

The connectivity states 58 are in the above described way continuously updated in the system store 54.

After having described this provision of connectivity states, now there will follow a more detailed description of the how queries are assigned to traffic distribution units and query handlers.

The traffic scheduler 52 of the traffic control unit TCU receives queries from the various applications. These queries may be first queries that these applications send. It may more particularly receive the first query Q1 from the first application A1, step 62. This query may as an example be a query intended for the fifth database 42, which is a Giraph database.

The traffic scheduler 52 of the traffic control unit TCU now investigates how the query is to be scheduled based on connectivity maps of the various traffic distribution units and selects traffic distribution unit based on connection map and connectivity states, step 64. This means that it investigates the type of database that is queried. In the example above, the traffic scheduler may find out that the database is the fifth database 42, i.e. the Giraph database, to which the third and the fourth query handler 28 and 32 has a connection. However, the connectivity state of the connection between the third traffic distribution unit 20 and the third query handler 28 may be zero and the connectivity state of the connection between the fourth traffic distribution unit 22 and the fifth query handler 32 may be one. This means that the query cannot be routed to the fifth database 42 via the third traffic distribution unit 20 and third query handler 28. Therefore the traffic scheduler 52 sends the first query Q1 to the fourth traffic distribution unit 22 instead, since it had a connectivity state of one for the connection to the fifth query handler 32 which accesses the fifth database 42 In another example the first query Q1 is a query to a Graph DB database, and in this case the fourth database 40, which may be accessed via the first or the second query handlers 24 and 26. If now the connectivity state of the connection between the first query handler 24 and the first traffic distribution unit 16 is zero, but the connectivity state of the connection between the second query handler 26 and the first traffic distribution unit 16 is one as depicted in FIG. 6, the traffic scheduler 52 of the traffic control unit TCU may send the first query Q1 to the first traffic distribution unit 16 and order it to use the second query handler 26. In this way the traffic scheduler 52 of the traffic control unit TCU selects traffic distribution unit and possibly also query handler and schedules the query to the selected traffic distribution unit, step 66. It may also inform the application of the selected traffic distribution unit.

The traffic distributor 51 of the selected traffic distribution unit then forwards the query to the query handler having the connection to the database type. In the first example, the fourth traffic distribution unit 22 received the query Q1 from the traffic control unit TCU. It then uses the own copy 55 of the system store and more particularly an own connectivity map, i.e. a connectivity map specifying the connections of the traffic distribution unit itself, in order to locate the database and query handler. The traffic distributor 51 of the fourth traffic distribution unit 22 then forwards the query to the fifth query handler 32. The fifth query handler 32 then sends the query Q1 to the fifth database 42, receives the response and then sends the response to the application A1. In the second example, the traffic control unit TCU sends the query Q1 to the traffic distributor 51 of the first traffic distribution unit 16 perhaps together with an instruction to use the second query handler 26. The traffic distributor 51 of the first traffic distribution unit 16 then uses the own copy 55 of the system store in order locate the right database and appropriate query handler. The traffic distributor 51 of the first traffic distribution unit 16 then sends the query Q1 to the second query handler 26. The second query handler 26 then sends the query Q1 to the fourth database 40, receives the response and then sends the response to the application A1.

It can in this way be seen that the traffic control unit TCU selects traffic distribution unit for a query from an application based on at least one connectivity map of the connections existing between traffic distribution units, query handlers and databases and connectivity states of connections between traffic distribution units and query handlers, and schedules the query to the selected traffic distribution unit for accessing a database. This does sometimes also involve selecting a query handler for the query and the scheduling may in this case comprise scheduling the query also to the query handler. The traffic control unit TCU thus distributes the queries to the traffic distribution units based on the connectivity map and connectivity states. In this way fault tolerance is obtained, which can be used for rebalancing of the handling of queries. Failures in the data grid layer is handled effectively. Critical information can always be accessed as the data grids run on multiple instances and the query traffic is distributed across all instances.

After a query has been scheduled in this way for the first query from an application, all subsequent queries from this application may thereafter be sent directly to the selected traffic distribution unit. This traffic distribution unit then decides the query handler to be used for each of these future queries from the application, which may be done dynamically only during runtime. Once a traffic distribution unit has been set by the traffic control unit for an application or for a type of query, this traffic distribution unit may thus be used for all further queries from the same application or the same type of query until there is a change in the network, i.e. a change in the connectivity maps and/or the states of the connections.

It can thus be seen that data grid instances connect to one of the traffic distribution units. Query handlers maintain transmission control protocol (TCP) connections through which they send requests, get responses, send heart beats, get watch events etc. If a TCP connection to a traffic distribution unit breaks, the query handler will connect to another traffic distribution unit. Every query handler thus sends a periodic heart beat to the traffic distribution unit to which it is connected. This heartbeat informs the traffic distribution unit that the query handler is alive. It can also be seen that the instances of traffic distributor cluster maintain an in-memory image of their state, along with transaction logs and snapshots in the system store. All traffic distributor machines/instances may also have a local copy of the system store and updates may be logged to disk for recoverability. Every traffic distributor instance serves a set of data grids.

Applications may connect to exactly one traffic distributor to submit requests, where read requests submitted to a traffic distribution unit may be served through the local copy of system store.

Figure 9:
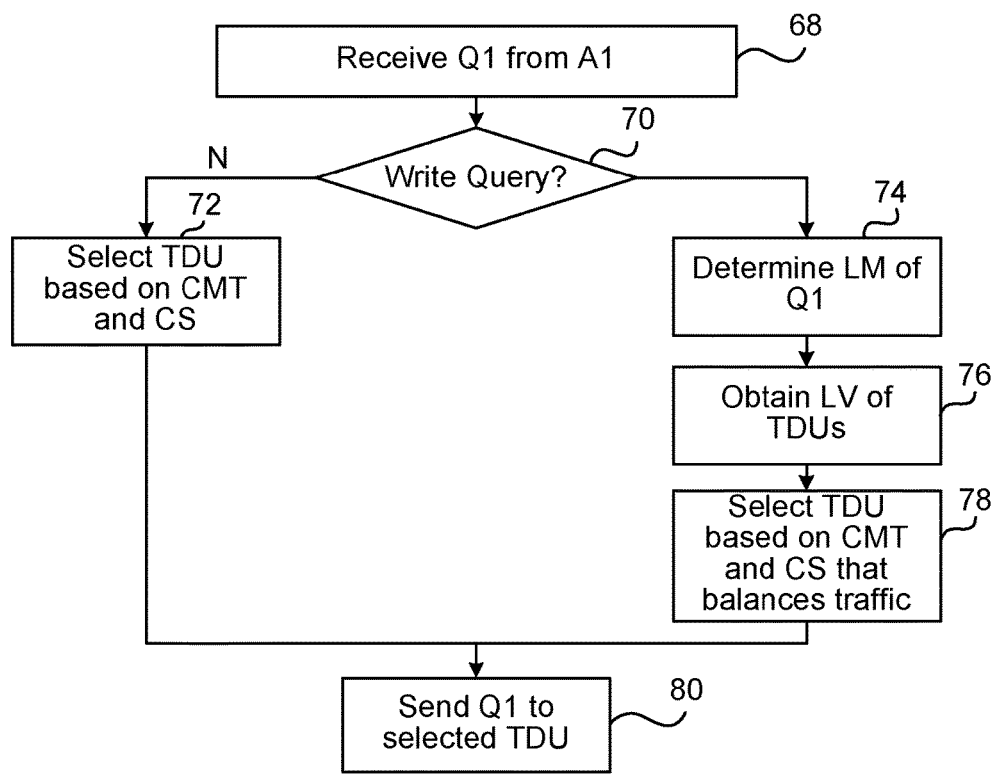
FIG. 9 shows a flow chart of a second embodiment of a method for coordinating database access in a federated database system.
Figure 10:
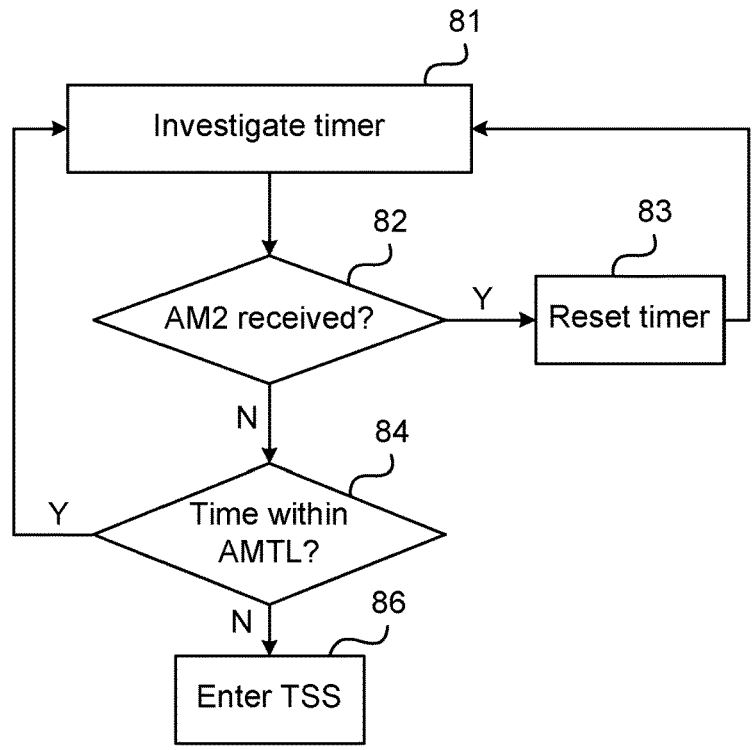
FIG. 10 shows a flow chart of a number of method steps being performed by a traffic distribution unit in order to determine if there is a need for selecting traffic control unit.

Now a second embodiment will be described with reference being made to FIGS. 1, 2, 3, 5, 6, 7 and 9, where FIG. 9 shows a flow chart of a second embodiment of a method for coordinating database access in a federated database system.

The first embodiment is advantageous if the only types of queries are read queries. However, it is often of interest to use also write queries. These queries are requests that change the state of the system and may be processed according to an agreement protocol, such as a service level agreement (SLA). According to the agreement protocol, all write requests received by various traffic distribution units may be forwarded to the traffic control unit TCU. When the traffic control unit TCU receives a write request, it may then calculate what the state of the system is and when the write is to be applied.

Also in this embodiment, the query handlers periodically send alive messages to the traffic distribution units they are connected. In this second embodiment they do send the first type of alive messages AM1 including load data, i.e. including load values Lm and Lcpu as well as time stamps TS and an alive indicators A.

As in the first embodiment the traffic scheduler 52 of the traffic control unit TCU receives queries from the various applications. It may more particularly receive the first query Q1 from the first application A1, step 70. The traffic control unit TCU now investigates if the query is a read or a write query. These queries are in this case also the first queries being generated by the applications.

If it is a read query, i.e. is not write query, step 70, then the traffic scheduler 52 of the traffic control unit TCU selects traffic distribution unit and query handler and routes the query Q1 in the same way as in the first embodiment, step 72, i.e. based on connectivity map and connectivity state and then the query is sent to the selected traffic distribution unit 80. It may also inform the application of the selected traffic distribution unit. The traffic distributor 51 of the selected traffic distribution unit then consults the local copy 55 of the system store and sends the query to the appropriate query handler. The query handler in question then sends the query to the appropriate database, receives the response and thereafter forwards the response to the application. Subsequent read queries from the application may thereafter be sent directly from the application to the selected traffic distribution unit which handles them based on the settings in the local copy 55 of the system store.

However, in case the query is a write query, step 70, then a load factor LF of the first query Q1 is determined, step 74.

This may be done in the following way:

As mentioned earlier every query handler reports load values using the first type of alive messages AM1. More particularly they report the cpu usage, i.e. the amount of processing used for processing queries as well as the amount of memory space taken up by queries. The cpu usage may more particularly be the amount of processing power used by the query handler in the databases to which it is connected and the amount of memory occupied in the same databases by the requests it sends to the same databases. The first query handler 24 could for instance report the cpu usage and memory usage made in relation to queries it handles for the first second and fourth databases 34, 36 and 40. A alive message from a query handler thus comprises at least one load value of the query handler. The reported load values may then be stored by the traffic distributor 51 of the traffic distribution unit in the load section 60 of the system store 54. It is assumed that the current cpu usage and memory usage of all databases in the data layer are sent as heartbeats by the query handlers to the corresponding traffic distribution units. Furthermore when a query is carried out by a query handler, also the cpu usage and memory usage of this query is determined and then stored in the query load section 61 of the system store 54. This may be done through a query handler reporting the memory usage and cpu usage of a performed write query to the traffic distribution unit to which it is connected. This data will then also be stored in the system store, either by the traffic distribution unit or by the traffic control unit, together with information about the type of query, which is what data types it writes and what tables it writes them into. There may also be table data comprising information about the number of rows of the tables.

Now as the first query Q1 is received by the traffic scheduler 52 of the traffic control unit TCU, it calculates a schedule for the query Q1.

In the calculation of the schedule for the write request, the traffic control unit may predict the resources that would be required to execute the request and it may also check if the current write request would change the state of the system store. It may then send a message proposal to a selected traffic distribution unit regarding the schedule of the write request and it may broadcast the latest copy of the system store to all traffic distribution units to ensure that all traffic distribution units are updated with the latest version of the system store. The traffic control unit and traffic distribution units may use an atomic messaging protocol and so the local copies may be consistent with the system store.

The scheduling may more particularly be performed in the following way. The traffic scheduler 52 of the traffic control unit TCU first fetches the load data of queries that are similar to the query in question. It then applies a pattern recognition technique, for instance k-nearest neighbour.

A query is of the same or similar type if the same or similar data types are to be written to different tables having the same number of rows. If, as an example, the first query Q1 states "write a and b to table c", while a similar query may state "write d and e to table f", where a and d are similar to each other, b and e are similar to each other and c and f are tables having the same number of rows.

If there are k such similar queries in the query load section 61 of the system store 54, the traffic scheduler 52 then fetches the cpu usage and memory usage values for all these 'k' similar queries from the query load section 61. Thereafter the traffic scheduler 52 determines load factors with respect to cpu usage and memory usage for the query.

A load factor 'L1' for the query 'Q' with respect to cpu usage may be calculated as a sum of weighted load values divided by a sum of weights. This may be done according to:

$$L_1 = \frac{\sum_{i \in k} w_i * cpuusage_i}{\sum_{i \in k} w_i}$$

where $w_i$ is a weight for cpu usage$_i$ associated with a query $q_i$ in the set k.

Similarly, load factor 'L2' for the query 'Q' with respect to memory usage may be calculated as a sum of weighted load values divided by a sum of weights.

$$L_2 = \frac{\sum_{i \in k} w_i * memoryusage_i}{\sum_{i \in k} w_i}$$

where $w_i$ is a weight for memory usage$_i$ associated with a query $q_i$ in the set k. Typically the weight may have a higher value the more similar it is to the query.

A load factor of the query may thus be determined as a weighted average of loads of similar queries In both cases, similarity between the query 'Q' and the queries $q_i$ in 'k' are the weights. Where w is the similarity between query 'Q' and each query in 'k', k may be determined empirically using a validation set.

The traffic control unit TCU thus determines at least one load factor for the query.

After the load factors have been determined in the above described way, the traffic scheduler 52 obtains load values of the different paths, i.e. the load values different query handlers are then obtained, step 76. These load values are the previously described load values reported in the alive messages of the first type. As an example, it can be seen in FIG. 7, that the first query handler 24 has the cpu usage load value Lcpu1 and memory usage load value Lm1, the second query handler 26 has the cpu load vale Lcpu2 ands the memory load value LM2, the third query handler 28 has the memory load value Lm3 and cpu load value Lcpu3, the fourth query handler 30 has the memory load value Lm4 and cpu load value Lcpu4 and the fifth query handler 32 has the memory load value Lm5 and cpu load value Lcpu5.

The traffic control unit TCU then selects a traffic distribution unit based on the previously described connectivity states and connectivity map, but also in a way that balances the traffic, step 78.

The connectivity maps and connectivity states provide data about possible paths for a query to a desired database, i.e. provide information about available routes to the database via the traffic distribution layer TDL and data grid layer DG.

The query Q is scheduled, by the traffic scheduler 52, to a query handler in such a way that at least one of cpu usage or memory usage is balanced across the data grid layer. There is thus a balancing of the load (memory or cpu usage) between the query handlers. Priority can be given to cpu usage alone, memory usage alone or to both depending on the SLA.

The traffic control unit thus schedules the query based on the load factor of the query and corresponding load values (Lm1, LM2, Lm3, Lm4, Lm5; Lcpu1, Lcpu2, Lcpu3, Lcpu4, Lcpu5) of the traffic distribution units, which scheduling may thus be made in order to achieve load balancing between the traffic distribution units.

Say for instance that the first query Q1 is a query to an Hbase database, i.e. to any of the first, third, sixth, seventh and ninth databases 34, 38, 44, 46 and 50. Assume that SLA species that priority is to be given to cpu usage and that the load factor LF of the first query is 5.

Now assume also that the cpu load value Lcpu1 of the first query handler 24 is 45, the cpu load value Lcpu2 of the second query handler 26 is 50, the cpu load value Lcpu3 of the third query handler 28 is 50, the cpu load value Lcpu4 of the fourth query handler 30 is also 50 and the cpu load value Lcpu5 of the fifth query handler 32 is 50 as well.

This would mean that the first query Q1 would be scheduled to the first query handler 24 as this will balance the cpu usage across all the query handlers. This would also mean that the traffic scheduler 52 of the traffic control unit TCU would assign the query Q1 to the first traffic distribution unit 16 as this unit is the one connected to the first query handler. The traffic scheduler 51 may in this regard also order the first traffic distribution unit 16 to use the first query handler. It may also be an instruction ordering the first traffic distribution unit 16 to select a query handler having the lowest cpu load value, which will in turn lead to a balancing being obtained.

The query 'Q1' is thus assigned to a query handler in such a way that the deviation in cpu usage, after accommodating the query Q1 with regard to the estimated cpu usage is minimized.

If there is more than one criterion to be considered, for example cpu usage, memory usage, I/O etc., then the query handler which has minimum deviation with respect to the majority of the criteria may be chosen. If priorities are defined in the SLA, then that can be used to chose the query handler for the given query.

The query is then sent to the selected traffic distribution unit, step 80. The application may also be informed of the selection. The traffic distributor 51 of the selected traffic distribution unit, in turn consults the local copy 55 of the system store and then forwards the query to the selected query handler. The query handler then sends the query to the database, receives a possible response and sends the response to the application.

Subsequent write queries from the application may thereafter be sent directly from the application to the selected traffic distribution unit. However, the traffic distribution unit will, because the query is a write query, send the query to the traffic control unit in order to receive details of how it needs to be scheduled. The traffic control unit will then determine load factors, step 74, obtain load values, step 76, and select traffic distribution unit based on connectivity maps, connectivity states and traffic balancing, step 78. This may thus involve selecting another traffic distribution unit for the subsequent query. The subsequent query is then forwarded to the selected traffic distribution unit and the traffic distribution unit from where the query was received, as well as the application, may be notified of the selection.

It can in this way be seen that it is possible obtain a distributed handling of queries together with a load balancing, which improves the efficiency of handling queries. The traffic scheduler thus ensures that there is a load balancing in the system at any given instant. It should also be realized cpu usage and memory usage are merely examples of parameters that may be used for load balancing. Any number of parameters can be considered for load management and the SLA can be changed accordingly to schedule traffic effectively.

Here it is furthermore worth noting that there may be changes to the system information in the system store. Connectivity maps may be changed or added, for instance because of additions or removal of databases, query handlers and/or traffic distribution units. The traffic control unit may be configured to inform such changes of the system information, i.e. changes in the system store, to all the traffic distribution units in the system. The traffic distribution units may then update their local copies of the system store accordingly. The traffic control unit may for this reason be equipped with a system updater that performs the abovementioned informing of system information.

Figure 11:
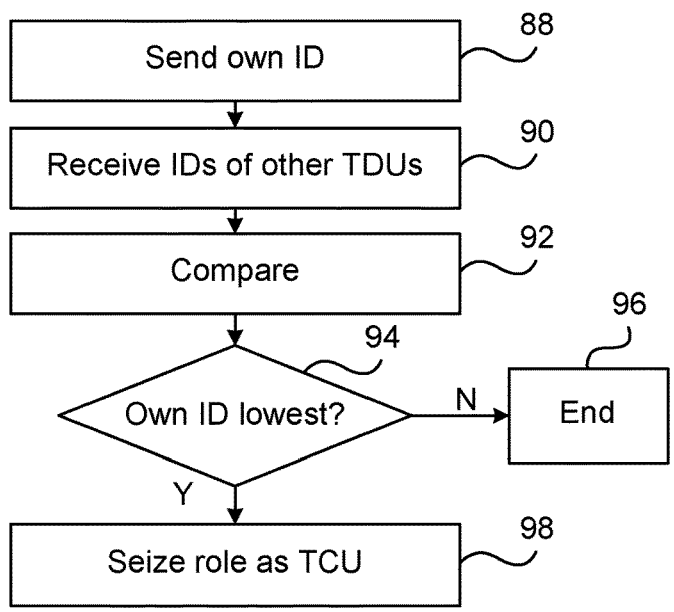
FIG. 11 shows a flow chart of a number of method steps being performed by a traffic control unit when determining if it is to act as a traffic control unit or not, FIG. 12 schematically shows a computer program product comprising a data carrier with computer program code for implementing the method for tuning connection parameters of a database in a federated database system, and FIG. 13 one realization of a database access coordination arrangement in the form of a processor with associated memory and program code.

It was earlier described how the second traffic distribution unit acted as traffic control unit. It is possible that a traffic control unit is unable to act as such, for instance because it loses contact with the other traffic distribution units. Now a third embodiment, in which this situation may be handled, will be described with reference being made to FIG. 11, which shows a flow chart of a number of method steps being performed by a control unit selector 53 of a traffic distribution unit in order to determine if there is a need for selecting traffic control unit and to FIG. 12, which shows a flow chart of a number of method steps being performed by the control unit selector 53 when determining if it is to act as a traffic control unit or not. The third embodiment may with advantage be combined with the first or second embodiments.

In this embodiment the traffic scheduler 52 of the traffic distribution unit that acts a traffic control unit sends the second type of alive message AM2 to the other traffic distribution units. The second type of alive message AM2 may just as the first type of alive messages be sent at regular time intervals, which is reflected by the time stamp TS.

The control unit selector 53 of a traffic distribution unit keeps a timer that operates based on alive messages from the traffic control unit TCU. The control unit selector 53 thus waits for the reception of the second type of alive message AM2 from the traffic scheduler 52 of the traffic control unit TCM, where the time of reception of the last alive message resets a timer. The value of this timer is continually investigated, step 81. If an alive message is received, step 82, then the timer is reset, step 83, which is followed by continued investigation of the timer, step 81. However, if during a check no alive message is received, step 82, the traffic distribution unit investigates if the time of the last received alive message is within an alive message time interval. This may be done through investigating if the timer has expired, which may happen if the timer has a value that exceeds a highest allowed timer value. In case the time is within the alive message time interval, the control unit selector 53 goes back and investigates the timer, step 81. If no alive message is received from the traffic control unit within the alive message time interval, step 84, then the control unit selector 53 enters a traffic control unit selection scheme TSS, step 86. As all the traffic distribution units operate in this way, they should all enter into this traffic control unit selection scheme if they fail to receive alive messages from the traffic control unit TCU.

The traffic distribution units that currently has the role of traffic control unit thus periodically sends alive messages to the other traffic distribution units, and a traffic distribution unit is configured to enter the traffic selection scheme, if no alive message is received from the traffic control unit within an alive message time limit.

In this scheme the control unit selector 53 of each traffic control unit then sends an own traffic distribution unit identity ID to all the other traffic distribution units, step 88. The control unit selector 53 of each traffic control unit also receives traffic distribution unit identities ID of the other traffic control units, step 90. The control unit selector 53 then compares the own identity with the received identities, step 92, and if the own identity is lower than the received identities, step 94, it seizes the role of traffic control unit, step 98. However, if any of the other traffic distribution units had a lower identity, the one of these that has the lowest identity seizes the role of traffic control unit.

It can thus be seen that each traffic distribution unit has an identity out of a number of sequentially generated identities that are assigned to the traffic distribution units at instantiating, and a traffic distribution unit sends, in the traffic selection scheme, the own identity to the other traffic distribution units, receives the identities of these other traffic distribution units, compares the own identity with the received identities and seizes the role of traffic control unit if the own identity precedes the others in the sequence.

In this way it is possible to select traffic control unit.

The identity may be a value that is a sequential value that a traffic distribution unit is assigned when it is instantiated for the first time.

It can thus be seen that all traffic distribution units receive a periodic second type of alive message, i.e. a heartbeat from the traffic control unit.

If the heartbeat is not received for a threshold time 't' then this is an indication that the traffic control unit has failed. In such situations, all traffic distribution units broadcast their identities to all other traffic distribution units. Locally, in each traffic distribution unit, a comparison between the own identity and all the received identities is made. If a traffic distribution unit has not received a sequential value, i.e. an identity, that is lower than the own sequential value it will take the role as traffic control unit. It then broadcasts a message to all other traffic distribution units that it is the traffic control unit. When all other traffic distribution units have acknowledged this message, the new traffic control unit may send a copy of its system store to all traffic distributing units for synchronization purposes. It may thus send a copy of all connectivity maps it has in its own local system store. The copy of the system store may furthermore be broadcast.

The idea behind electing the traffic distribution units with the lowest sequential number is that it must have been the oldest instance in the cluster and so it would have the most updated copy of the system store among all other traffic distribution units.

Figure 13:
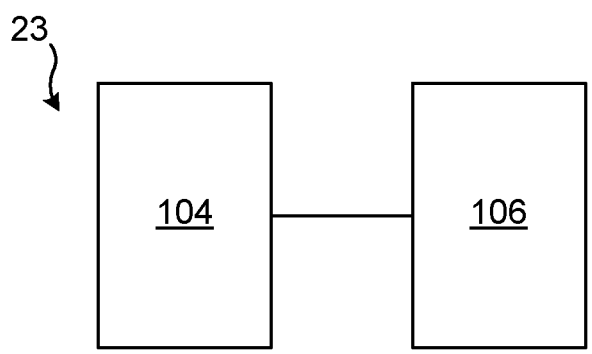

The database access coordination arrangement may be provide in the form one or more processors with associated program memories comprising computer program code with computer program instructions executable by the processor for performing the functionality of the traffic distribution layer. One such processor 104 with associated computer program code 106 is shown in FIG. 13.

Figure 12:
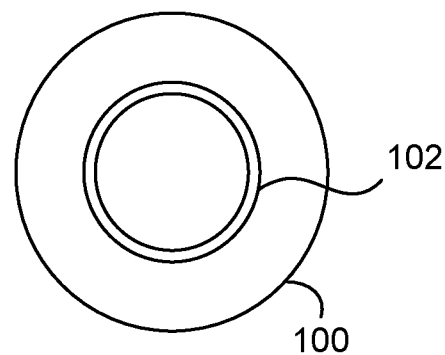

The computer program code of a database access coordination arrangement may also be in the form of computer program for instance on a data carrier, such as a CD ROM disc or a memory stick, carrying such a computer program with the computer program code, which will implement the functionality of the above-described database access coordination arrangement. One such data carrier 100 with computer program code 102 is schematically shown in FIG. 12.

Furthermore the traffic scheduler may be considered to form means for selecting traffic distribution unit for a query from an application based on at least one connectivity map of the connections existing between traffic distribution units, query handlers and databases and connectivity states of connections between traffic distribution units and query handlers, and means for scheduling the query to the selected traffic distribution unit for accessing a database.

The traffic scheduler may also be considered to comprise means for selecting a query handler for the query and means for scheduling the query also to the query handler.

The traffic control unit may further be considered to comprise means for determining at least one load factor for the query and means for scheduling the query based on the load factor of the query and corresponding load values of the traffic distribution units.

The traffic control unit may also be considered to comprise means for periodically sending alive messages to the other traffic distribution units, The control unit selector may also be considered to comprise means for entering a traffic selection scheme if no alive message is received from the traffic control unit within an alive message time limit.

The control unit selector may furthermore be considered to form means for sending the own identity to the other traffic distribution units, means for receiving the identities of these other traffic distribution units, means for comparing the own identity with the received identities and means for seizing the role of traffic control unit if the own identity precedes the others in the sequence.

The system updater may be considered to form means for informing changes related to connectivity maps to the traffic distribution units While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A database access coordination arrangement in a federated database system, the database system comprising applications configured to access databases under the control of a number of query handlers, each query handler being connected to a number of databases, the database access coordinating arrangement comprising a processor and a memory, said memory containing computer instructions executable by said processor whereby said database access coordination arrangement is operative to provide:

a group of traffic distribution units, each having connections to corresponding query handlers; and a traffic control unit, said traffic control unit being configured to:

select a traffic distribution unit for a query from an application based on at least one connectivity map of the connections existing between traffic distribution units, query handlers and databases and connectivity states of connections between traffic distribution units and query handlers;

schedule the query to the selected traffic distribution unit for accessing at least a database, wherein at least a connectivity state of at least a connection depends on alive messages sent by at least a query handler to a corresponding traffic distribution unit, and wherein an alive message from the query handler comprises at least one load value of the query handler;

determine whether the query is a write query; and as a result of determining that the query is the write query, determine at least one load factor for the query and schedule the query based on the load factor of the query and corresponding load values of the traffic distribution units.

2. The database access coordination arrangement according to claim 1, the traffic control unit being further configured to select at least a query handler for the query.

3. The database access coordination arrangement according to claim 1, wherein the connectivity state of the connection is connected if alive messages are timely received and is disconnected if the alive messages are not timely received.

4. The database access coordination arrangement according to claim 1, wherein the traffic distribution unit is selected for the query such that the load is balanced between the traffic distribution units.

5. The database access coordination arrangement according to claim 1, wherein the load factor of the query is determined as a weighted average of loads of similar queries.

6. The database access coordination arrangement according to claim 1, wherein one of the traffic distribution units acts as the traffic control unit, wherein each traffic distribution unit has an identity, wherein the identities are sequentially generated and assigned at instantiating, and at least one of the traffic distribution units is configured to, in a traffic selection scheme, send the own identity to the other traffic distribution units, receive the identities of the other traffic distribution units, compare the own identity with the received identities and seize the role of traffic control unit if the own identity precedes the others in a sequence.

7. The database access coordination arrangement according to claim 6, wherein the traffic control unit is configured to periodically send alive messages to the other traffic distribution units, and said at least one of the traffic distribution units is configured to enter the traffic selection scheme, if no alive message is received from the traffic control unit within an alive message time limit.

8. The database access coordination arrangement according to claim 1, wherein a connectivity map is provided for each traffic distribution unit.

9. A method for coordinating database access in a federated database system, the database system comprising applications configured to access databases under the control of a number of query handlers, each query handler being connected to a number of databases and to one or more traffic distribution units in a group of traffic distribution units, the method comprising:
   selecting a traffic distribution unit for a query from an application based on at least one connectivity map of the connections existing between traffic distribution units, query handlers and databases and connectivity states of connections between traffic distribution units and query handlers;
   scheduling the query to the selected traffic distribution unit for accessing a database, wherein a connectivity state of a connection depends on alive messages sent by at least a query handler to a corresponding traffic distribution unit, and wherein an alive message from the query handler comprises at least one load value of the query handler;
   determining whether the query is a write query; and
   as a result of determining that the query is the write query, determining at least one load factor for the query and schedule the query based on the load factor of the query and corresponding load values of the traffic distribution units.

10. The method according to claim 9, further comprising selecting the query handler for the query, wherein the scheduling comprises scheduling the query also to the query handler.

11. The method according to claim 9, wherein the connectivity state of the connection is connected if alive messages are timely received and disconnected if the alive messages are not timely received.

12. The method according to claim 9, wherein the selection of traffic distribution unit comprises selecting the traffic distribution unit for the query such that the load is balanced between the traffic distribution units.

13. The method according to claim 12, wherein the load factor of the query is determined as a weighted average of loads of similar queries.

14. The method according to claim 9, wherein one of the traffic distribution units acts as a traffic control unit performing said selection of traffic distribution unit, each traffic distribution unit has an identity, where the identities are sequentially generated and assigned at instantiating, the method further comprising, in each traffic distribution unit in a traffic selection scheme:
   sending the own identity to the other traffic distribution units;
   receiving the identity of the other traffic distribution units;
   comparing the own identity with the received identities; and
   seizing the role of traffic control unit if the own identity precedes the others in the sequence, where the role of traffic control unit comprises the selecting of the traffic distribution unit for the query and scheduling the query to the selected traffic distribution unit.

15. The method according to claim 14, wherein the traffic control unit is configured to periodically send alive messages and the method further comprises entering the traffic selection scheme if no alive message is received from the traffic control unit within an alive message time limit.

16. A computer program for coordinating database access in a federated database system, the database system comprising applications configured to access databases under the control of a number of query handlers, each query handler being connected to a number of databases and to one or more traffic distribution units in a group of traffic distribution units, the computer program comprising computer program code which when run in a database access coordination arrangement, causes the database access coordination arrangement to:
   select a traffic distribution unit for a query from an application based on at least one connectivity map of the connections existing between traffic distribution units, query handlers and databases and connectivity states of connections between traffic distribution units and query handlers;
   schedule the query to the selected traffic distribution unit for accessing a database, wherein a connectivity state of a connection depends on alive messages sent by a query handler to a corresponding traffic distribution unit, and wherein an alive message from the query handler comprises at least one load value of the query handler;
   determine whether the query is a write query; and
   as a result of determining that the query is the write query, determine at least one load factor for the query and schedule the query based on the load factor of the query and corresponding load values of the traffic distribution units.

17. A computer program product for coordinating database access in a federated database system, said computer program product being provided on a non-transitory computer readable storage medium comprising computer program code which when run in a database access coordination arrangement, causes the database access coordination arrangement to:
   select a traffic distribution unit for a query from an application based on at least one connectivity map of the connections existing between traffic distribution units, query handlers and databases and connectivity states of connections between traffic distribution units and query handlers;
   schedule the query to the selected traffic distribution unit for accessing a database, wherein a connectivity state of a connection depends on alive messages sent by a query handler to a corresponding traffic distribution unit, and wherein an alive message from the query handler comprises at least one load value of the query handler;
   determine whether the query is a write query; and
   as a result of determining that the query is the write query, determine at least one load factor for the query and schedule the query based on the load factor of the query and corresponding load values of the traffic distribution units.

* * * * *